April 28, 1936.                M. L. REDING                2,038,905
                                THERMOMETER
                            Filed July 28, 1934
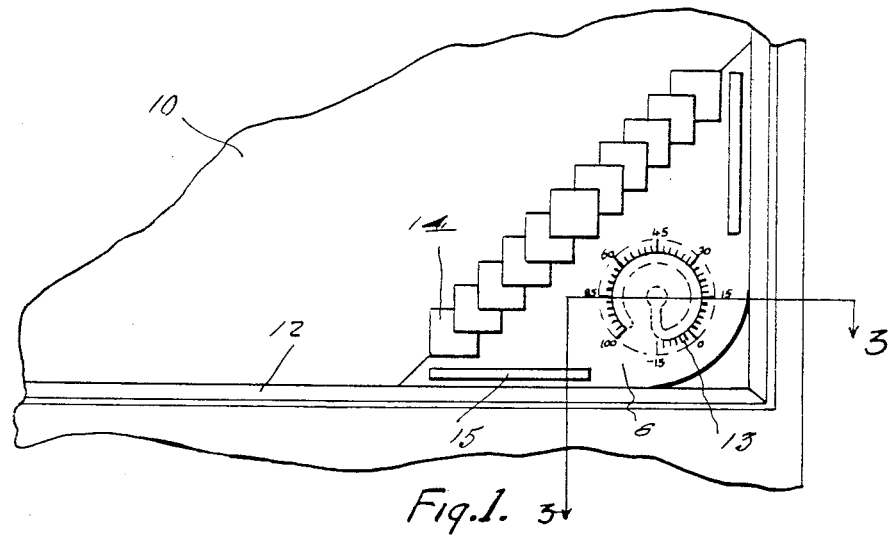
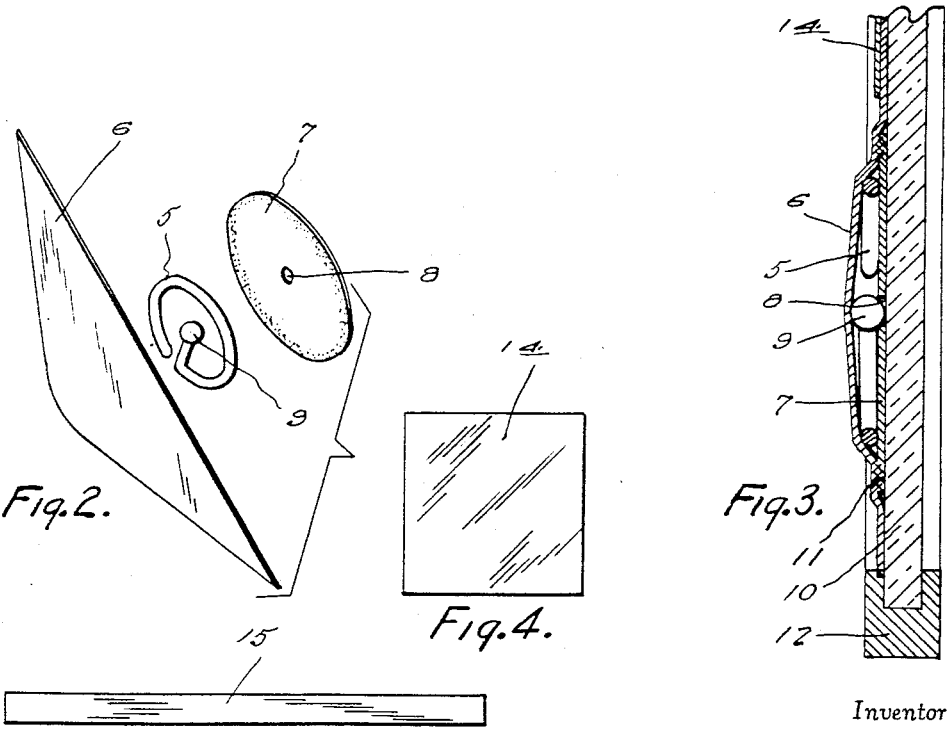
Inventor
Morse L. Reding
By
Atty.

73. MEASURING AND TESTING.
376

Patented Apr. 28, 1936

2,038,905

UNITED STATES PATENT OFFICE 2,038,905

THERMOMETER

Morse L. Reding, Joelton, Tenn.

Application July 28, 1934, Serial No. 737,444

6 Claims. (Cl. 73—52)

The present invention relates to thermometers and more particularly to a thermometer designed for attaching to the windshield of an automobile in such a manner to indicate the atmospheric temperature to the driver.

One of the important objects of the invention is to provide a mounting for a device of this character which is composed of a group of variegated color sections intended to add to the attractiveness of the article, said sections being also capable of carrying advertising or other display matter.

A further object is to provide a thermometer embodying the above characteristics which can be easily and quickly placed in position against a windshield without requiring any special attaching means and without necessitating any changes or alterations in the windshield construction.

Other objects and advantages reside in the details of construction as more fully hereinafter described and claimed, reference being had to the accompanying drawing forming part hereof, wherein like numerals refer to like parts throughout, and in which Figure 1 is a fragmentary elevational view of an automobile windshield showing the device in position with respect thereto, Figure 2 is a group perspective view of the sheets of material for mounting the thermometer tube therebetween, Figure 3 is a sectional view taken substantially on a line 3—3 of Figure 1, and Figures 4 and 5 are enlarged plan views of the sections of colored material used to provide the color display upon the thermometer mounting.

Referring now to the drawing in detail, wherein for the purpose of illustration I have disclosed a preferred embodiment of my invention, the numeral 5 designates a closed thermometer tube of usual construction within which is contained a quantity of mercury or other expansible heat responsive fluid. The tube 5 may be of any desired shape or configuration, the article herein shown comprising a tube of generally circular construction which is placed between two sheets of transparent material, such as Cellophane or the like, designated at 6 and 7 to form a mounting therefor. The sheet 7 is provided with an opening 8 adapted to receive the knob 9 of the tube, to such an extent that the knob will bear against the windshield 10 when the sheet 7 is placed thereagainst. The sheet 7 is of a slightly greater area than the tube and is secured to one surface of the sheet 6 by fusing the edges of the sheet 7 as indicated at 11 whereby the tube is firmly enclosed between the two sheets.

The sheet 6 may be of any desired shape and is held in place by wedging one or more of its edges between the windshield 10 and the rubber molding 12 usually forming a part of the windshield construction. The outer surface of the sheet 6 is provided with a scale 13 corresponding in shape to that of the tube and by means of which variations in the temperature may be read.

The surface of the sheet 6 is ornamented by securing a series of smaller sheets or segments 14 thereto. These segments are likewise constructed of Cellophane or like material which are capable of being secured to the sheet 6 or to each other in overlapping arrangement by fusing when a heated tool or the like is placed against the same and these smaller segments 14 are colored so that various combinations may be employed to form any desired distinctive and attractive display upon the sheet 6. The segments 14 furthermore may be of any desired shape or configuration and in addition other segments 15 of a different shape may be secured to the sheet 6 as a further means of ornamenting the mounting for the thermometer.

The sheet 6 and the segments 14 may also be provided with advertising matter and if desired each segment may carry a portion of the advertisement and matched in their proper position upon the sheet 6.

Preferably the sheets 6 and 7 have their surfaces roughened to render the same more or less translucent. As more clearly shown in Figure 3 the thermometer is placed in position with the perforated sheet 7 next to the windshield glass in order that a portion of the tube will contact the glass and thus respond to the temperature thereof.

While I have disclosed a preferred embodiment of my invention it is obvious the same is susceptible of various changes and modifications without departing from the spirit of the invention or the scope of the appended claims.

I claim:

1. A thermometer comprising a mounting formed of a plurality of sheets of fusible, transparent material having a thermometer tube positioned therebetween, said sheets being secured to each other by fusing and one of said sheets being perforated to expose the thermometer bulb whereby the bulb may contact a window glass when the mounting is secured thereto to indicate atmospheric temperature.

2. A thermometer comprising a mounting composed of a pair of sheets of fusible, transparent material having a thermometer tube positioned therebetween, said sheets being secured to each other by fusing, one of said sheets being perforated to expose the thermometer bulb whereby the bulb may contact a window glass when the mounting is secured thereto to indicate atmospheric temperature and a scale on one of the sheets associated with the tube to provide a reading for the tube.

3. A mounting for a thermometer tube composed of a plurality of pieces of flexible, fusible material having the tube positioned therebetween, said pieces of material being secured to each other by fusing, one of said pieces of material being perforated to expose the tube to atmospheric temperature, and one of said pieces of material being transparent and having a scale thereon in association with the tube to provide a reading for the tube.

4. A mounting for a thermometer tube comprising a pair of sheets of fusible material at least one of which is transparent and secured to each other by fusing whereby to enclose the thermometer tube between the sheets, one of said sheets being of greater area than the other to provide a single thickness of material at the marginal edges of the mounting to facilitate the insertion of the edge of the mounting between a window pane and its frame.

5. A mounting for a thermometer tube comprising a pair of sheets of fusible material secured to each other by fusing whereby to enclose the thermometer tube between the sheets, one of said sheets being of greater area than the other to provide a single thickness of material at the marginal edges of the mounting to facilitate the insertion of the edge of the mounting between a window pane and its frame, at least one of said sheets being transparent and one of the sheets having an opening to expose the tube to atmospheric temperature.

6. A mounting for a thermometer tube comprising a plurality of pieces of relatively thin flat sheets of pliable fusible material arranged in superposed relation, one of said sheets being bent partially around the tube and secured to another sheet by fusing to enclose the tube between the sheets, at least one of the sheets being transparent for reading the thermometer.

MORSE L. REDING.